(12) United States Patent
Zhu et al.

(10) Patent No.: US 10,365,812 B2
(45) Date of Patent: *Jul. 30, 2019

(54) USER INTERFACE DESIGN FRAMEWORK

(71) Applicant: SAP SE, Walldorf (DE)

(72) Inventors: Jin You Zhu, Singapore (SG); Xiang Cai, Singapore (SG)

(73) Assignee: SAP SE, Walldorf (DE)

( * ) Notice: Subject to any disclaimer, the term of this patent is extended or adjusted under 35 U.S.C. 154(b) by 368 days.

This patent is subject to a terminal disclaimer.

(21) Appl. No.: 15/284,512

(22) Filed: Oct. 3, 2016

(65) Prior Publication Data

US 2017/0024114 A1  Jan. 26, 2017

Related U.S. Application Data

(63) Continuation of application No. 14/011,724, filed on Aug. 27, 2013, now Pat. No. 9,483,239.

(51) Int. Cl.
 *G06F 3/048* (2013.01)
 *G06F 3/0484* (2013.01)
 *G06F 8/38* (2018.01)
 *G06F 3/0481* (2013.01)

(52) U.S. Cl.
 CPC ........ *G06F 3/04847* (2013.01); *G06F 3/0481* (2013.01); *G06F 3/04842* (2013.01); *G06F 8/38* (2013.01)

(58) Field of Classification Search
 CPC .............................. G06F 3/04847; G06F 8/38
 USPC .................................................. 715/863, 762
 See application file for complete search history.

(56) References Cited

U.S. PATENT DOCUMENTS

| | | | | |
|---|---|---|---|---|
| 7,631,290 | B1 * | 12/2009 | Reid | ........................ G06F 8/38 715/764 |
| 2008/0092057 | A1 * | 4/2008 | Monson | .................. G06F 9/451 715/744 |

* cited by examiner

*Primary Examiner* — Timothy D Collins
*Assistant Examiner* — Terri L Filosi
(74) *Attorney, Agent, or Firm* — Jones Day

(57) ABSTRACT

Disclosed herein are technologies for a WYSIWYG user interface (UI) design tool that enables runtime behaviors (e.g., content update and user interaction) with UI controls during design time of such controls. That is, using a UI design tool in accordance with the technology described herein, the human designer can see and experience the runtime behavior of the UI controls while designing those controls. This Abstract is submitted with the understanding that it will not be used to interpret or limit the scope or meaning of the claims.

20 Claims, 5 Drawing Sheets

USER INTERFACE DESIGN FRAMEWORK

This application is a continuation application of co-pending U.S. patent application Ser. No. 14/011,724 filed Aug. 27, 2013, which is herein incorporated by reference it its entirety.

TECHNICAL FIELD

The present disclosure relates generally to a design framework for user interfaces.

BACKGROUND

Application software is a computer-executable program that directs a computer (e.g., personal computer, tablet computer, smartphone, etc.) to perform useful tasks for the benefit of the end user of the computer. Typically, application software is not involved in merely operating the computer itself. Individual application software packages are often called simply an application or an app.

Typically, an app has a user interface (UI) that allows a user (i.e., human) to interact with an application and the computer/network associated with that application. Many apps have a graphical user interface (i.e., graphical UI or GUI), which is a type of user interface that allows users to interact with electronic devices through graphical icons and visual indicators.

A GUI includes UI controls, which may be called UI elements or UI components. Examples of UI controls include buttons, lists, and text fields. UI controls are commonly used for organizing content displayed in the GUI, for providing a mechanism for user navigation and input, for notifying about app status change, and/or other such events and actions.

When creating an app, a programmer often uses a UI design tool. Often these UI design tools have a what-you-see-is-what-you-get (WYSIWYG) interface. Using a WYSIWYG UI design tool, the human designer can see the appearance of the UI while actually designing the UI.

The design time is when the human designer designs the UI using the design tool. The runtime is when the app executes, which is typically after the UI is designed. During runtime, the app's UI controls perform runtime actions such as updating content, interacting with a user, and the like. With conventional design tools, the UI controls do not perform runtime behaviors during design time. Instead, during design time, the UI controls are displayed with no content or static content. In addition, the conventional design tools do not allow user interactions with the UI controls during design time.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are technologies for a WYSIWYG user interface (UI) design tool that enables runtime behaviors (e.g., content update and user interaction) of UI controls during design time of such controls. That is, using a UI design tool in accordance with the technology described herein, the human designer can see and experience the runtime behavior of the UI controls while designing those controls.

In accordance with the technology described herein, the exemplary UI design tool employs multiple layers to represent the content of the UI controls and the design-time indicators. In this way, the UI controls can show the dynamic runtime content in the design tool at design time. The human designer may interact with the UI controls while performing design-time actions. Furthermore, the exemplary UI design tool may show the content of UI controls while the human designer is performing design-time actions on the UI controls. The design-time actions include, for example, selecting a UI control, resizing a UI control, moving a UI control, and changing the properties of a UI control.

Figure 1A:
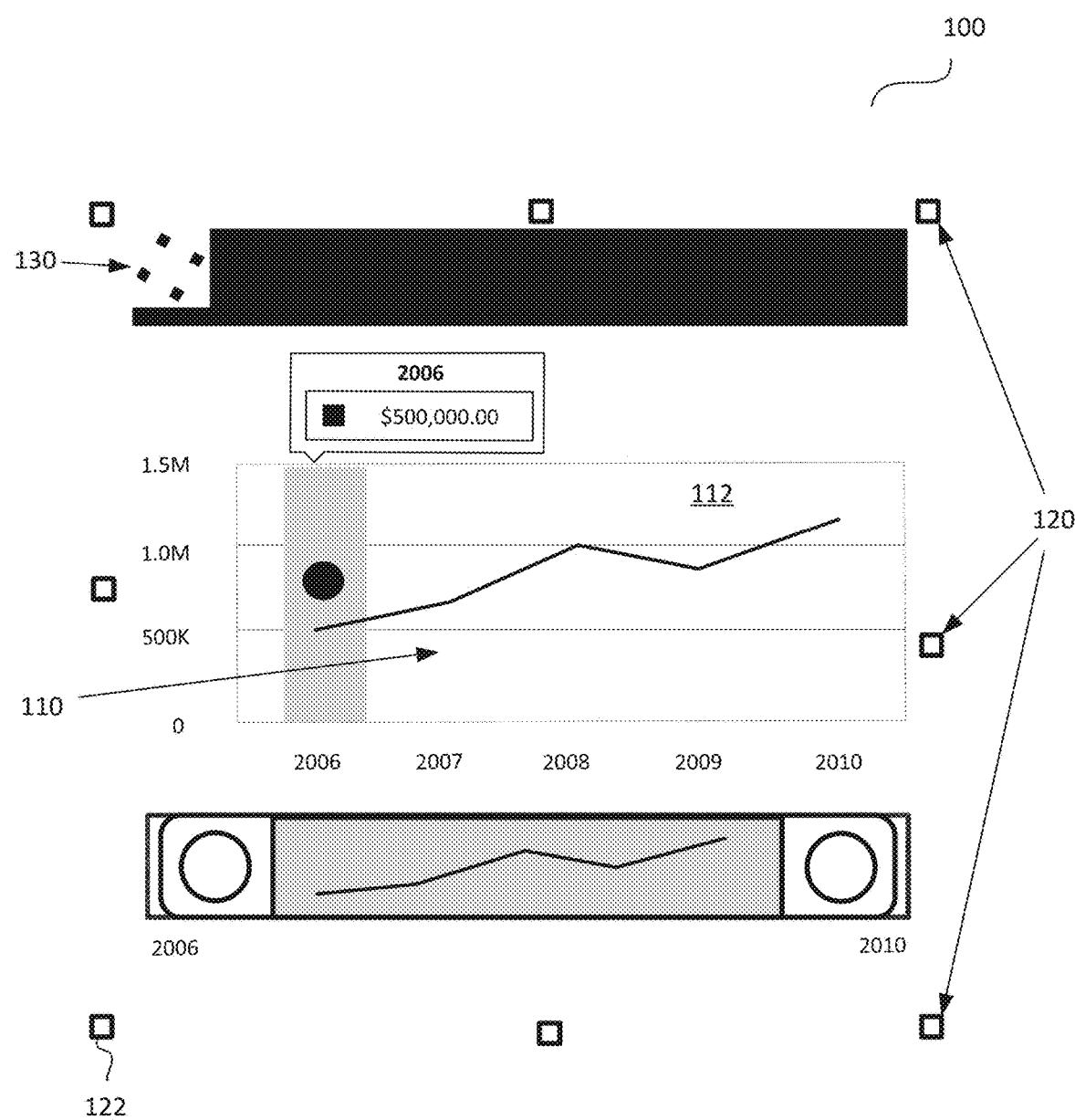
FIGS. 1A and 1B show different views of an exemplary user interface.
Figure 1B:
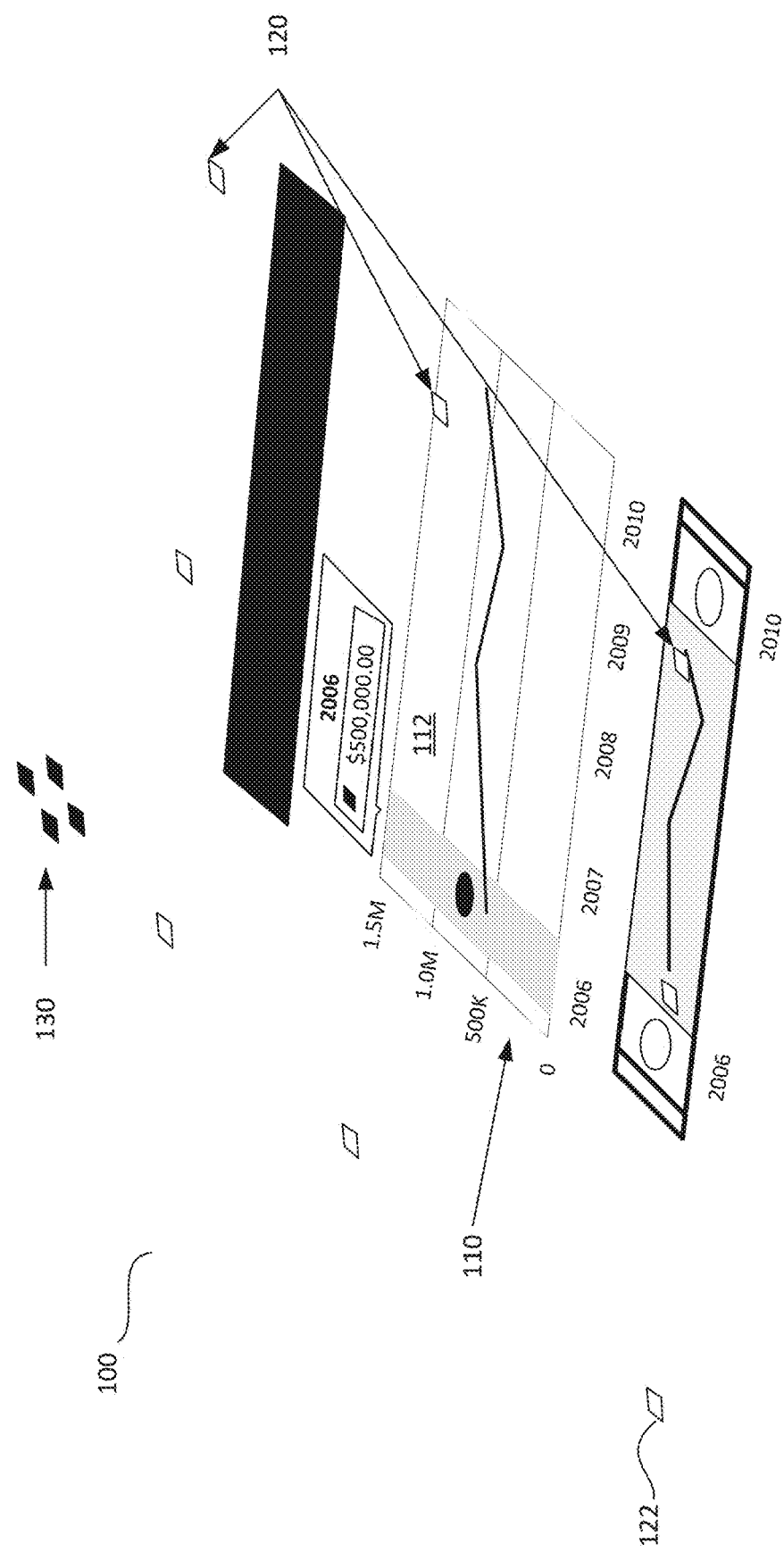

FIGS. 1A and 1B show two different views of an exemplary graphical user interface (GUI) 100. FIG. 1A shows the GUI 100 in a straight-on manner, which is the manner as the GUI would appear on a display. FIG. 1B shows an axonometric projection of a pseudo-three-dimensional form of the GUI 100.

An exemplary UI design tool in accordance with the technology described herein represents the UI that is being designed (i.e., "being-designed UI") in multiple layers. More particularly, each UI control is represented via a multiple layer model. For illustration purposes, a three-layer model is discussed herein. It should be appreciated, however, that the multiple layer model may include more than three layers.

Herein, the multiple layer model may be called an active design-time object model. The active design-time object model that is described herein may support inter alia a User Interface (UI) or other control (such as for example a display element, a data entry field, a selection mechanism, a graphical element, etc.) that may, for example, be included in an application that will possibly among other things reside, run, etc. on a client device.

An active design-time object (such as for example a UI control) may inter alia exchange data, information, etc. with possibly among other things one or more local sources (e.g., repositories, caches, etc.) and/or one or more back-end sources (e.g., systems, repositories, etc.). For example, a certain UI control may inter alia retrieve data from various sources; optionally process, aggregate, enhance, etc. aspects of the data; and then display results in one or more forms (e.g., as a table, as a graph, as a chart, etc.).

As shown in FIGS. 1A and 1B, a first or base layer 110 of the active design-time object model includes a UI control 112 and its runtime appearance and behavior. Indeed, the first layer 110 appears and behaves the same in both runtime and design time with the exemplary UT design tool. As shown in FIGS. 1A and 1B, the UI control 112 of the first layer 110 is a graph/chart that is generated based upon a data source.

As shown, a second or border layer 120 includes multiple (e.g., eight) small squares (e.g., 122) around the periphery (i.e., border) of the UI control 112. As depicted, these squares appear in the four corners of the rectangular periphery and in the midpoints between the corners. This group of small squares, collectively, is an example of a design-time adjustment indicator. When this appears, the human designer may adjust the design-time properties of the UI control 112. Examples of such design-time properties include size of the UI control, shape of the UI control, position of the UI control relative to other UI controls, position of the UI control on the display, orientation of the UI control, and format (e.g., color, text font, etc.) of the UI control.

With the exemplary UI design tool, the peripheral squares are displayed when the UI control 112 is selected for adjustment of the design-time properties. With the exemplary UI design tool, the border layer 120 includes particular design-time functions, such as resizing of the UI control 112.

As shown, a third or anchor layer 130 includes an icon (such as a four-headed arrow icon) in the upper left-hand corner of the UI control 112. The four-headed arrow icon is another example of a design-time adjustment indicator. When this appears, the human designer may adjust certain design-time properties of the UI control 112. Examples of such design-time properties include size of the UI control, shape of the UI control, position of the UI control relative to other UI controls, position of the UI control on the display, orientation of the UI control, and format (e.g., color, text font, etc.) of the UI control. With the exemplary UI design tool, the anchor layer 130 includes particular design-time functions, such as moving of the UI control 112.

In FIG. 1B, each layer (110, 120, and 130) is depicted as if it is separated from the other layers in a third dimension. This shows that the anchor layer 130 overlays the border layer 120, which in turn overlays the base layer 110. This depiction is merely for illustration purposes only. In reality, the layers overlap and are shown together on a two-dimensional display. Further, some implementations of the UI design tool may be configured so that the design-time adjustment indicators display only at specific times, such as when the UI control 112 is selected.

In the exemplary UI design tool, the model defines information for using the UI control 112 at design time. The information of the base layer 110 may include name and type of the control, initialization info, and the like. The model also includes information about the border layer 120 on its outlook and event handling. For some UI controls, the anchor layer 130 has information for its outlook and event handling. If information on the various layers is not expressly provided, default layers and behaviors will take place. The definition may be implemented in formats such as eXtensible Mark-up Language (XML) or JavaScript Object Notation (JSON). Here is an example for chart definition in JSON format:

```
{
    name: "chart1",
    type: "Chart",
    isContainer: false,
    init: { },
    BorderLayer:{
        image:"square.png",
        events:{"onmousemove", "onmousedown", "onmouseup"}
    },
    AnchorLayer:{
        image: "anchorpng",
        events:{"onmousemove", "onousedown", "onmouseup"}
    }
}
```

Figure 2:
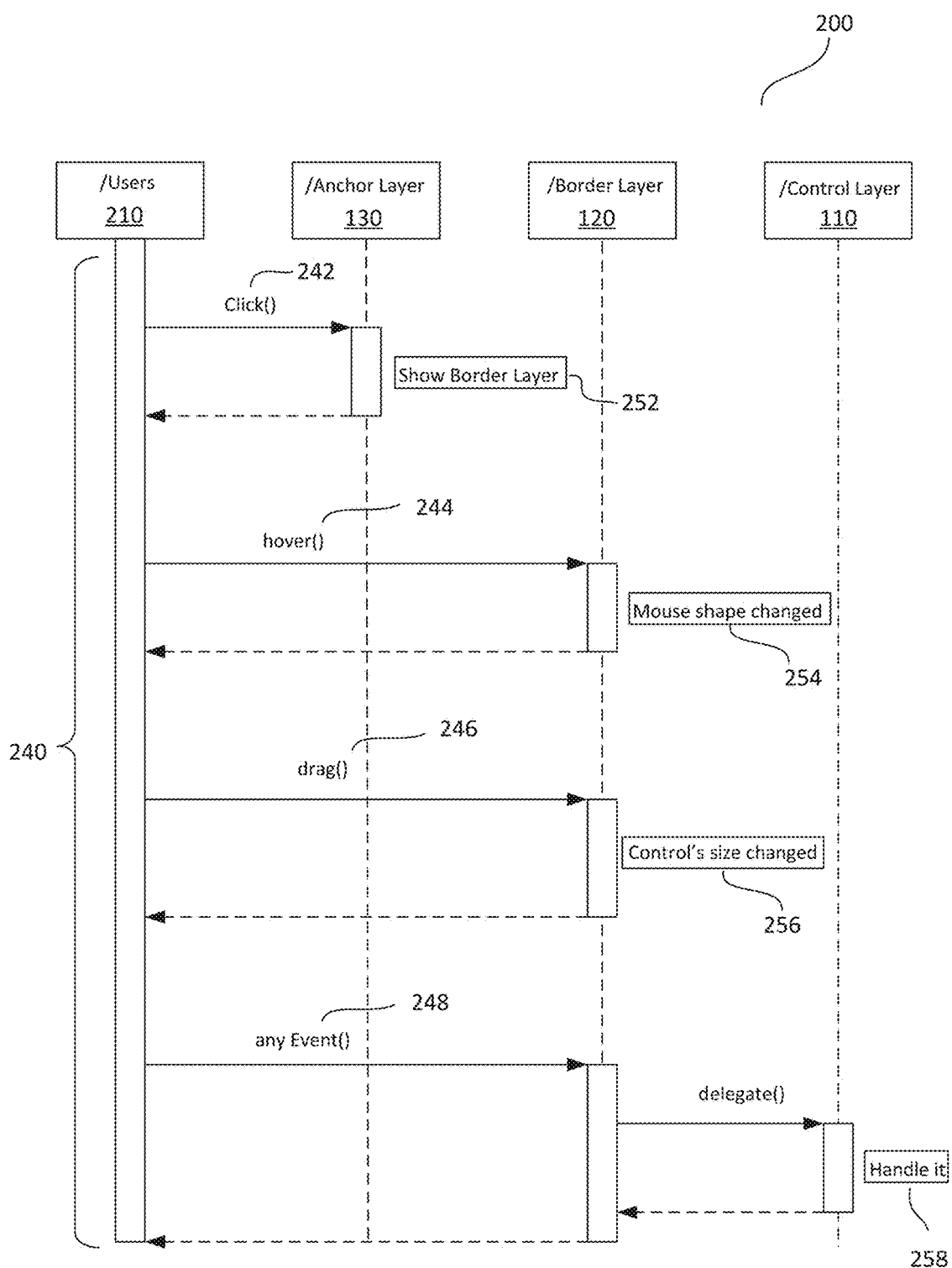
FIG. 2 is a sequence diagram for event handling of an exemplary UI design tool.

FIG. 2 shows a sequence diagram 200 for event handling of an exemplary UI design tool in accordance with the technology described herein. A sequence diagram is a kind of interaction diagram that shows how processes operate with one another and in what order. In this example, the sequence diagram 200 shows how the user 210 interacts with the exemplary UI design tool and presumably generates events 240. Examples of such events include a mouse click 242, mouse hover 244, a drag 246, and any other event 248. In addition, in this example, particular layers respond to particular event. Such responses include, for example, showing border layer 252, mouse shape changed 254, UI control size changed 256, and a default handling of events 258.

For this particular example, specific events and results are configured to occur. For example, when mouse cursor moves to an anchor area (e.g., the area occupied by the four-headed arrow anchor icon as seen in FIGS. 1A and 1B), the anchor layer 130 will receive and react to the events. The anchor layer 130 will handle certain events defined for it and pass the other events to the border layer 120. The default action for the anchor layer 130 is mouse down, mouse move, and mouse up. Therefore, when the user clicks and holds down the left button, the UI control (e.g., UI control 112 of FIGS. 1A and 1B) will go into movement status. The users can move the UI control freely. Releasing the mouse button will exit from the movement status.

With a click on the UI control or on the anchor icon, the exemplary design tool shows the border layer indicators (e.g., border squares such as 122 of FIGS. 1A and 1B). When the mouse moves over the border squares in this layer, the border layer 120 will receive and react to the events. It will handle certain events and pass the others to the base layer 110. When the border layer 120 takes action, the mouse pointer will change accordingly. The users can click and hold down the left button to resize the UI control.

If the mouse moves into the area of the UI control other than where the design-time adjustment indicators are displayed, the base layer 110 will take over the event handling. The base layer 110 will perform its behavior and interaction as it would during runtime.

Figure 3:
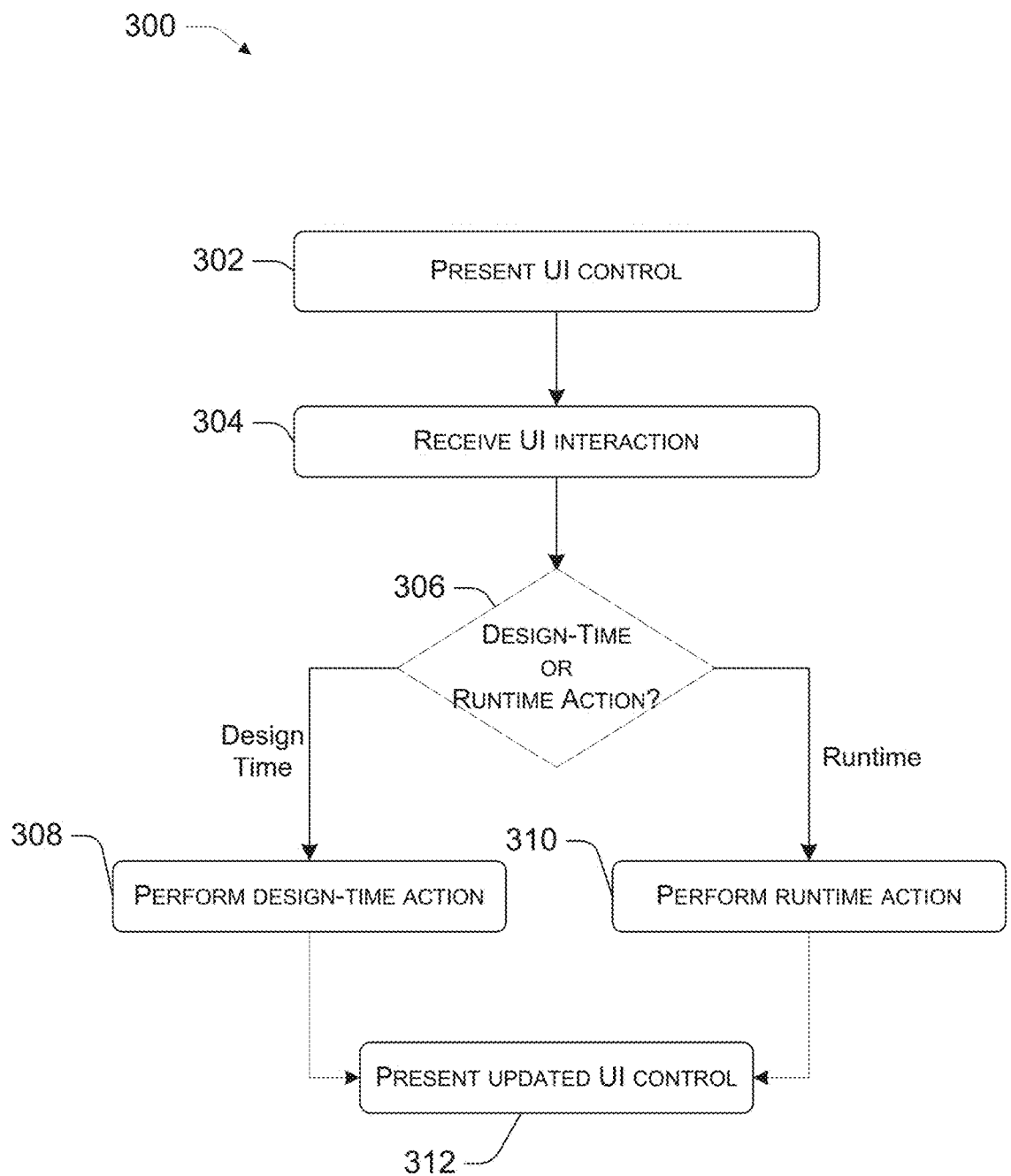
FIG. 3 illustrates an exemplary process.

FIG. 3 illustrates an exemplary process 300 for implementing, at least in part, the technology described herein. In particular, process 300 depicts an operation of an exemplary user interface (UI) design tool having UI controls with runtime behaviors. The process 300 is performed by, for example, the computer system 400. The operations of the method are performed during design time rather than runtime.

At 302, the exemplary UI design tool presents (e.g., displays) at least one UI control of a graphics user interface (GUI) on a display device. FIG. 1A depicts an example of such a presentation.

At 304, the exemplary UI design tool receives a UI interaction that is associated with the UI control. Typically, the user interacting with a UI control creates the association with the UI control. Such an interaction may include hovering over the UI control, clicking or otherwise selecting a portion of the UI control, and the like. The UI interaction includes, for example, the user interaction discussed and described above with regard to FIG. 2. For example, when the user clicks and holds down the left mouse button on the anchor icon, the UI control (e.g., UI control 112 of FIGS. 1A and 1B) will go into movement status.

At 306, the exemplary UT design tool determines whether to perform a design-time action of the UI control or to perform a runtime action of the UI control. This determination is based upon where in the GUI area that the user is interacting and how that interaction is occurring. For example, a click and hold may be a different user interaction event than a mere click and release, or a hover (move), which is different from a drag, which holds and moves.

If the exemplary UI design tool determines to perform a design-time action, then the process 300 proceeds to operation 308. Otherwise, the process 300 proceeds to operation 310.

At 308, the exemplary UI design tool performs a design-time action, such as selecting the UI control, resizing the UI control, repositioning the UI control, re-orienting the UI control, and reformatting the UI control. When a UI control is selected, the design tool displays design-time adjustment indicator with the GUI on the display. The design-time adjustment indicator (e.g., eight small squares) may be displayed along a periphery of the UI control.

At 310, the exemplary UI design tool performs a runtime action of the UI control. For example, the runtime action may include displaying, within the UI control, data from the received UI interaction; displaying, within the UI control, user input from the received UI interaction; displaying, within the UI control, reformatted content; and acquiring updated content based upon the received UI interaction and displaying, within the UI control, the updated content.

At 312, the exemplary UI design tool presents (e.g., displays) the updated UI control of a graphics user interface (GUI) on a display. The updated UI control is the result from the performance of the design-time action and/or the runtime action of the UI control.

Figure 4:
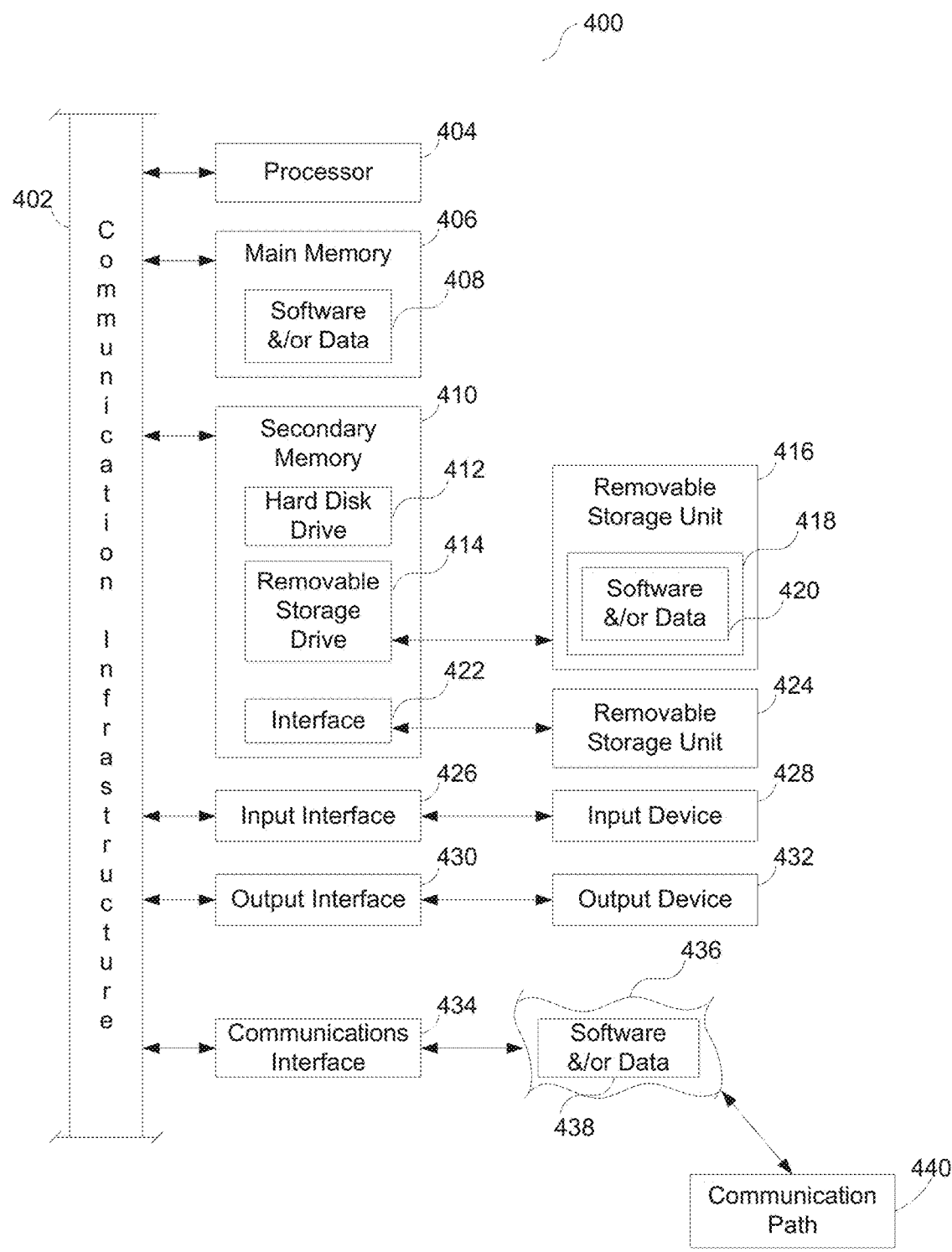
FIG. 4 illustrates an exemplary computing device.

FIG. 4 illustrates an exemplary system 400 that may implement, at least in part, the technologies described herein. The computer system 400 includes one or more processors, such as processor 404. Processor 404 can be a special purpose processor or a general purpose processor. Processor 404 is connected to a communication infrastructure 402 (for example, a bus or a network). Depending upon the context, the computer system 400 may also be called a client device.

Computer system 400 also includes a main memory 406, preferably Random Access Memory (RAM), containing possibly inter alia computer software and/or data 408.

Computer system 400 may also include a secondary memory 410. Secondary memory 410 may include, for example, a hard disk drive 412, a removable storage drive 414, a memory stick, etc. A removable storage drive 414 may comprise a floppy disk drive, a magnetic tape drive, an optical disk drive, a flash memory, or the like. A removable storage drive 414 reads from and/or writes to a removable storage unit 416 in a well-known manner. A removable storage unit 416 may comprise a floppy disk, a magnetic tape, an optical disk, etc. which is read by and written to by removable storage drive 414. As will be appreciated by persons skilled in the relevant art(s) removable storage unit 416 includes a computer usable storage medium 418 having stored therein possibly inter alia computer software and/or data 420.

In alternative implementations, secondary memory 410 may include other similar means for allowing computer programs or other instructions to be loaded into computer system 400. Such means may include, for example, a removable storage unit 424 and an interface 422. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 424 and interfaces 422 which allow software and data to be transferred from the removable storage unit 424 to computer system 400.

Computer system 400 may also include an input interface 426 and a range of input devices 428 such as, possibly inter alia, a keyboard, a mouse, etc.

Computer system 400 may also include an output interface 430 and a range of output devices 432 such as, possibly inter alia, a display, one or more speakers, etc.

Computer system 400 may also include a communications interface 434. Communications interface 434 allows software and/or data 438 to be transferred between computer system 400 and external devices. Communications interface 434 may include a modem, a network interface (such as an Ethernet card), a communications port, a Personal Computer Memory Card International Association (PCMCIA) slot and card, or the like. Software and/or data 438 transferred via communications interface 434 are in the form of signals 436 which may be electronic, electromagnetic, optical, or other signals capable of being received by communications interface 434. These signals 436 are provided to communications interface 434 via a communications path 440. Communications path 440 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to non-transitory media such as removable storage unit 416, removable storage unit 424, and a hard disk installed in hard disk drive 412. Computer program medium and computer usable medium can also refer to memories, such as main memory 406 and secondary memory 410, which can be memory semiconductors (e.g. Dynamic Random Access Memory (DRAM) elements, etc.). These computer program products are means for providing software to computer system 400.

Computer programs (also called computer control logic) are stored in main memory 406 and/or secondary memory 410. Such computer programs, when executed, enable computer system 400 to implement the present technology described herein. In particular, the computer programs, when executed, enable processor 404 to implement the processes of aspects of the above. Accordingly, such computer programs represent controllers of the computer system 400. Where the technology described herein is implemented, at least in part, using software, the software may be stored in a computer program product and loaded into computer system 400 using removable storage drive 414, interface 422, hard disk drive 412 or communications interface 434.

The technology described herein may be implemented as computer program products comprising software stored on any computer useable medium. Such software, when executed in one or more data processing devices, causes data processing device(s) to operate as described herein. Embodiments of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

The narrative that is presented herein is for purposes of illustration only and it will be readily apparent to one of ordinary skill in the relevant art that numerous alternatives (involving for example other components, different component arrangements, additional component interactions, etc.) are easily possible. For example and possibly inter alia:

- A definition (e.g., configuration) may employ artifacts, paradigms, techniques, technologies, etc. other than XML. For example and inter alia a definition may be created, crafted, etc. by a system administrator, an application developer, etc. using among other things a GUI facility (that may offer among other things a What You See Is What You Get (WYSIWYG) capability), Application Programming Interfaces (APIs), computer code libraries, etc.
- Various of the interactions that were described herein (e.g., between a client device and a back-end system) may optionally contain any combination of one or more of information elements (such as for example a relevant or applicable factoid, a piece of product information, etc.), advertisements, promotional items, coupons, vouchers, surveys, questionnaires, gift cards, retailer credits, etc. Such material may be selected statically or randomly (from for example a repository of defined material), may be location-based (for example, selected from a pool of available material based on possibly inter alia information about the current physical location of a user's client device), etc.
- Repositories that may be employed during the above activities may encompass among other things any combination of one or more of conventional Relational Database Management Systems (RDBMSs), Object Database Management Systems (ODBMS), in-memory Database Management Systems (DBMS), equivalent data storage and management facilities, etc.
- Various of the interactions that were described above (e.g., between a client device and a back-end system) may optionally leverage, reference, etc. information on the current physical location of a user's client device as obtained through inter alia one or more of a Location-Based Service (LBS) facility, a Global Positioning System (GPS) facility, etc. to among other things enhance security, provide more applicable or appropriate information, etc.
- A layer of an object may incorporate, leverage, etc. any number of static and/or dynamic display artifacts such as icons, symbols, decorations, connectors, colors, fonts, labels, etc. and may optionally include inter alia information elements (such as for example a relevant or applicable factoid, a piece of product information, etc.), advertisements, promotional items, coupons, vouchers, surveys, questionnaires, gift cards, retailer credits, etc.
- A client device user may optionally save, checkpoint, etc. aspects of some or all of an object (e.g., layout, arrangement, data values, settings, etc.). Such an action may optionally capture a range of values (such as for example a name, a date and time, an amount, etc.) and may employ storage, space, etc. on any combination of one or more of inter alia a client device and/or one or more back-end sources (e.g., repositories, systems, etc.). Aspects of a save, checkpoint, etc. operation may optionally be retrieved, recovered, etc. at a later time.
- A client device user may optionally share, convey, send, etc. aspects of some or all of an object (e.g., layout, arrangement, data values, settings, etc.) to among other things another client device.
- Various of the interactions that were described above (e.g., between a client device and a back-end system, between client devices, etc.) may among other things optionally employ any combination of one or more of inter alia a (Short Message Service (SMS), a Multimedia Message Service (MMS), an Internet Protocol (IP) Multimedia Subsystem (IMS), etc.) message exchange, a Wireless Application Protocol (WAP) exchange, a structured or an unstructured data transfer, a data transfer operation atop one or more proprietary or standards-based protocols (such as for example TCP/IP), an Electronic Message (E-Mail) exchange, an Instant Messaging (IM) exchange, Wi-Fi, a Near Field Communication (NFC) exchange, etc.
- The universe of sources from which an object may draw, pull, etc. data is dynamically extensible and may comprise inter alia any combination of one or more of local (e.g., resident on a client device) and/or remote (e.g., resident on one or more back-end systems, repositories, etc.) environments.
- An object (such as for example a UI control) may optionally be animated. For example, through various layers, event, configuration, etc. definitions of the appearance, operation, etc. of an object may among other things iterate through various predefined, random, etc. states and during same the object may optionally exchange data, information, etc. with one or more local sources and/or remote sources.
- An object may employ a flexible, extensible, and dynamically configurable Data Exchange Adapter in support of its data exchanges. For example and inter alia as new data sources are identified, included, etc. a Data Exchange Adapter component may be modified, added to, reconfigured, etc. to seamlessly support the new data sources.
- The specific JSON representation structure, content, format, etc. that was depicted above is illustrative only and it will be readily apparent to one of ordinary skill in the art that numerous alternative arrangements, elements, structures, etc. are easily possible.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The invention claimed is:

1. A method that facilitates development of a graphical user interface (GUI) for an executable application, the method comprising:
   providing a user interface (UI) design tool to design a user interface (UI) control of a GUI, the UI control having a multiple layer model referred to as an active design-time object model comprising,
      a first layer displays the UI control with runtime appearance and handling events for runtime actions,
      a second layer comprising a second design-time adjustment indicator, the second layer handles events for design-time actions to adjust design-time properties of the UI control, and
      a third layer comprising a third design-time adjustment indicator which serves as another design-time adjustment indicator, the third layer handles events which are defined to be handled by the third layer for design-time actions to adjust design-time properties of the UI control,
      wherein the layers are depicted as overlapping layers on a two-dimensional display, and
      wherein the UI control is presented on the first layer; and
   performing, by a user, a user interface (UI) interaction, the UI interaction includes a performed event on the UI control, wherein
      handling of the performed event is performed by the layer corresponding to the design-time adjustment indicator at which the performed event occurred,
      handling of the performed event is passed to another layer for handling if the design-time adjustment indicator at which the performed event occurred is not defined to handle the performed event, and
      handling of the performed event is performed by the first layer if the performed event does not occur at any design-time adjustment.

2. The method according to claim 1 wherein in runtime, the performed event causes performance of a corresponding runtime action.

3. The method according to claim 2 wherein the UI design tool determines if the UI interaction is
   a design-time UI interaction to cause the UI design tool to operate in design-time, or
   a runtime UI interaction to cause the UI design tool to operate in runtime.

4. The method according to claim 1 wherein the third design-time adjustment indicator comprises an icon disposed at a corner of the UI control.

5. The method according to claim 1 wherein the second design-time adjustment indicator comprises a plurality of second design-time adjustment indicators disposed along a periphery of the UI control.

6. The method according to claim 1 wherein the second design-time adjustment indicator comprises a plurality of second design-time adjustment indicators displayed along a periphery of the UI control.

7. The method according to claim 1, wherein the design-time action of the UI control comprises:
   selecting the UI control;
   resizing the UI control;
   repositioning the UI control;
   re-orienting the UI control, and
   reformatting the UI control.

8. The method according to claim 1, wherein the runtime action of the UI control comprises:
   displaying, within the UI control, data from the performed UI interaction;
   displaying, within the UI control, user input from the performed UI interaction;
   displaying, within the UI control, reformatted content; and
   acquiring updated content based upon the performed UI interaction and displaying, within the UI control, the updated content.

9. One or more non-transitory computer-readable media storing processor-executable instructions that when executed cause one or more processors to perform operations of a design tool that facilitates a development of graphical user interface (GUI) for an executable application, the operations comprising:
   presenting, via a user interface (UI) design tool, a user interface (UI) control of a GUI on a two-dimensional display, the UI control having a multiple layer model referred to as an active design-time object model comprising,
      a first layer displays the UI control with runtime appearance and handling events for runtime actions,
      a second layer comprising a second design-time adjustment indicator, the second layer handles events for design-time actions to adjust design-time properties of the UI control, and
      a third layer comprising a third design-time adjustment indicator which serves as another design-time adjustment indicator, the third layer handles events which are defined to be handled by the third layer for design-time actions to adjust design-time properties of the UI control,
      wherein the layers are depicted as overlapping layers on a two-dimensional display, and wherein the UI control is presented on the first layer; and performing, by a user, a user interface (UI) interaction, the UI interaction includes a performed event on the UI control, wherein handling of the performed event is performed by the layer corresponding to the design-time adjustment indicator at which the performed event occurred, handling of the performed event is passed to another layer for handling if the design-time adjustment indicator at which the performed event occurred is not defined to handle the performed event, and handling of the performed event is performed by the first layer if the performed event does not occur at any design-time adjustment.

10. The one or more non-transitory computer-readable media according to claim 9, wherein the operations are performed during a design-time of the UI control rather than a runtime, wherein the runtime occurs during execution of the executable application.

11. The one or more non-transitory computer-readable media according to claim 9, wherein the performing of the design-time action includes adjusting the design-time properties of the UI control.

12. The one or more non-transitory computer-readable media according to claim 9, wherein the performing of the design-time action includes displaying the design-time adjustment indicator with the GUI on the display.

13. The one or more non-transitory computer-readable media according to claim 9, wherein the performing of the design-time action includes displaying the design-time adjustment indicator along a periphery of the UI control.

14. The one or more non-transitory computer-readable media according to claim 9, wherein the design-time action of the UI control comprises one of:
 selecting the UI control;
 resizing the UI control;
 repositioning the UI control;
 re-orienting the UI control; and
 reformatting the UI control.

15. The one or more non-transitory computer-readable media according to claim 9, wherein the runtime action of the UI control comprises one of:
 displaying, within the UI control, data from the performed UI interaction;
 displaying, within the UI control, user input from the performed UI interaction;
 displaying, within the UI control, reformatted content; and
 acquiring updated content based upon the performed UI interaction and displaying, within the UI control, the updated content.

16. One or more non-transitory computer-readable media storing processor-executable instructions that when executed cause one or more processors to perform operations that facilitate development of a graphical user interface (GUI) for an executable application, the operations comprising:
 displaying the GUI with a user interface (UI) control to a user on a display, the GUI comprises an active design-time object model having multiple layers, wherein the multiple layers of the active design-time model includes
  a first layer displays the UI control with runtime appearance and handling events for runtime actions,
  a second layer comprising a second design-time adjustment indicator, the second layer handles events for design-time actions to adjust design-time properties of the UI control, and
  a third layer comprising a third layer design-time adjustment indicator which serves as another design-time adjustment indicator, the third layer handles events which are defined to be handled by the third layer for design-time actions to adjust design-time properties of the UI control,
   wherein the layers are depicted as overlapping layers on a two-dimensional display, and
   wherein the UI control is presented on the first layer; and performing, by a user, a user interface (UI) interaction, the UI interaction includes a performed event on the UI control, wherein handling of the performed event is performed by the layer corresponding to the design-time adjustment indicator at which the performed event occurred, handling of the performed event is passed to another layer for handling if the design-time adjustment indicator at which the performed event occurred is not defined to handle the performed event, and handling of the performed event is performed by the first layer if the performed event does not occur at any design-time adjustment.

17. The one or more non-transitory computer-readable media according to claim 16, wherein the design-time action of the UI control is selected from a group consisting of:
 selecting the UI control;
 resizing the UI control;
 repositioning the UI control;
 re-orienting the UI control; and
 reformatting the UI control.

18. The one or more non-transitory computer-readable media according to claim 16, wherein the operations further comprise displaying the design-time adjustment indicator with the GUI on the display.

19. The one or more non-transitory computer-readable media according to claim 16, wherein the operations further comprise displaying the design-time adjustment indicator along a periphery of the UI control.

20. The one or more non-transitory computer-readable media according to claim 16, wherein the runtime action of the UI control is selected from a group consisting of:
 displaying, within the UI control, data from the performed UI interaction;
 displaying, within the UI control, user input from the performed UI interaction;
 displaying, within the UI control, reformatted content; and
 acquiring updated content based upon the performed UI interaction and displaying, within the UI control, the updated content.

\* \* \* \* \*